US008805914B2

(12) United States Patent
Pell et al.

(10) Patent No.: US 8,805,914 B2
(45) Date of Patent: Aug. 12, 2014

(54) METHOD AND APPARATUS FOR PERFORMING NUMERICAL CALCULATIONS

(75) Inventors: Oliver Pell, London (GB); James Huggett, London (GB)

(73) Assignee: Maxeler Technologies Ltd., London (GB)

( * ) Notice: Subject to any disclaimer, the term of this patent is extended or adjusted under 35 U.S.C. 154(b) by 715 days.

(21) Appl. No.: 12/792,197

(22) Filed: Jun. 2, 2010

(65) Prior Publication Data

US 2011/0302231 A1 Dec. 8, 2011

(51) Int. Cl.
G06F 7/38 (2006.01)
G06F 7/00 (2006.01)
G06F 15/00 (2006.01)

(52) U.S. Cl.
USPC ............................ 708/498; 708/552; 708/208

(58) Field of Classification Search
USPC ......... 708/400–410, 496–498, 550–553, 201, 708/208–209
See application file for complete search history.

(56) References Cited

U.S. PATENT DOCUMENTS

| 4,872,132 | A  | * | 10/1989 | Retter | 708/505 |
| 5,481,488 | A  | * | 1/1996  | Luo et al. | 708/404 |
| 5,717,620 | A  | * | 2/1998  | Williams | 708/404 |
| 6,411,978 | B1 | * | 6/2002  | Naveh et al. | 708/404 |
| 6,728,739 | B1 | * | 4/2004  | Kobayashi et al. | 708/208 |
| 6,996,597 | B2 | * | 2/2006  | Mathur et al. | 708/550 |
| 7,197,525 | B2 | * | 3/2007  | Stein et al. | 708/409 |
| 2004/0255284 | A1 | * | 12/2004 | Kobayashi | 717/151 |
| 2009/0112955 | A1 | * | 4/2009  | Kershaw et al. | 708/201 |
| 2009/0292750 | A1 | * | 11/2009 | Reyzin et al. | 708/209 |
| 2009/0306800 | A1 | * | 12/2009 | Van Dalen et al. | 700/97 |
| 2010/0250636 | A1 | * | 9/2010  | Banister et al. | 708/208 |

FOREIGN PATENT DOCUMENTS

WO WO 00/07114 * 2/2000 ............ G06F 17/00

OTHER PUBLICATIONS

Shiro Kobayashi and Gerhard Fettweis, "A new approach for block-floating-point arithmetic," Acoustics, Speech, and Signal Processing, 1999. ICASSP '99. Proceedings., vol. 4, pp. 2009-2012, 1999.*
Altera Corporation, "FFT MegaCore Function User Guide," version 9.0, Mar. 2009.*
David Elam and Cesar Lovescu, "A Block Floating Point Implementation for an N-Point FFT on the TMS320C55x DSP," Texas Instruments Application Report SPRA948, Sep. 2003.*
Mark Littlefield and Jeff Wetch, "FPGAs for Stream Processing: A Natural Choice," COTS Journal, Apr. 2007, retrieved from http://www.cotsjournalonline.com/articles/view/100649.*
C. Bleakley, V. Berg, J. Rodriguez, and B. Murray, "FILU-200 DSP coprocessor IP core," 33rd Asilomar Conference on Signals, Systems, and Computers, pp. 757-761, 1999.*

* cited by examiner

Primary Examiner — Chuong D Ngo
Assistant Examiner — Matthew Sandifer
(74) Attorney, Agent, or Firm — Conley Rose, P.C.

(57) ABSTRACT

There is provided a method of processing an iterative computation on a computing device comprising at least one processor. Embodiments of the method comprises performing, on a processor, an iterative calculation on data in a fixed point numerical format having a scaling factor, wherein the scaling factor is selectively variable for different steps of said calculation in order to prevent overflow and to minimize underflow. By providing such a method, the reliability, precision and flexibility of floating point operations can be achieved whilst using fixed point processing logic. The errors which fixed-point units are usually prone to generate if the range limits are exceeded can be mitigated, whilst still providing the advantage of a significantly reduced logic area to perform the calculations in fixed point.

28 Claims, 7 Drawing Sheets

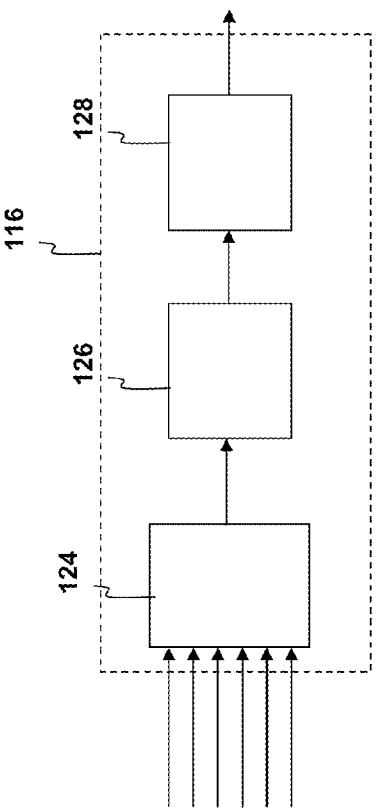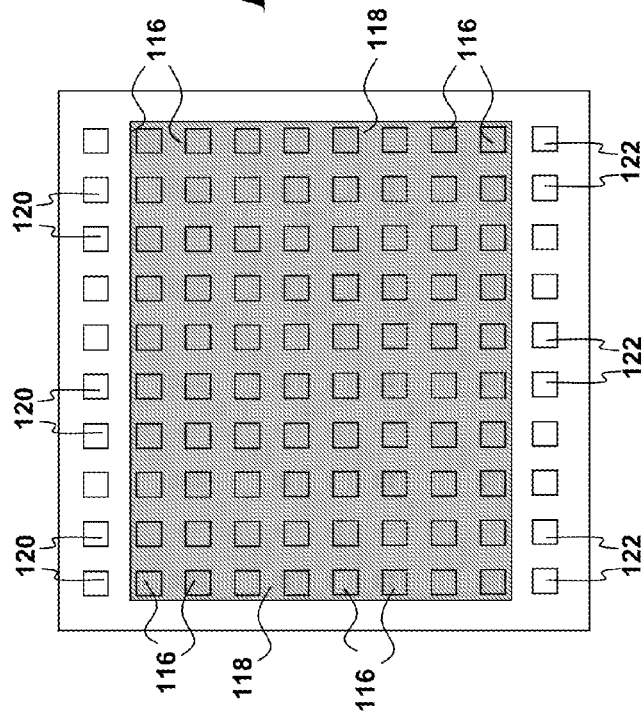

METHOD AND APPARATUS FOR PERFORMING NUMERICAL CALCULATIONS

STATEMENT REGARDING FEDERALLY SPONSORED RESEARCH OR DEVELOPMENT

Not applicable.

BACKGROUND OF THE INVENTION

Field of Invention

The invention relates to a method of, and apparatus for, performing iterative numerical calculations.

BRIEF SUMMARY OF THE PREFERRED EMBODIMENTS

Computer systems are often used to solve complex numerical calculations. One important area in which they are used is in the modelling of real-world conditions and environments; for example, the modelling of: weather systems, fluid dynamics of an object, the motion of stars in a galaxy, an explosive device, or seismic wave propagation.

Often, computer programs are run which create in the computer memory a multi-dimensional "mesh" of the area or region to be modelled. Each data area in the mesh then corresponds to an area in space and contains information about that space relevant to the model. For example, in weather models, each area might correspond to a square mile; with land elevation, wind direction, humidity, temperature, pressure, and other parameters entered for that particular data area. The program may then calculate the likely next state of the data area based on the current state in simulated time steps.

Alternatively, the computational model may model, in one application, a three-dimensional wave-field "forward modelling" by finite difference. Forward modelling computes the propagation of a wave through a medium. It does this by maintaining state of one or more pressure fields at a particular time point, and using the current and previous state(s) to compute the state at the next time point. This may be used in fields such as oil prospecting, seismology, geological investigations or in the construction industry.

Generally, such computational models require iterative numerical calculations to be solved for a large number of data areas or data points. Therefore, such calculations are usually extremely resource-intensive and a significant time period is required to perform the necessary calculations. Whilst a processor such as a central processing unit (CPU) found in most computing systems is able to process such calculations, the time period required may be prohibitive unless powerful computing systems are used.

Traditionally, the performance of a computing system has been increased by increasing the operating frequency of the CPU (i.e. by increasing the number of operations the CPU can carry out per second) and by reducing the size of the individual transistors on the CPU so that more transistors can be accommodated per unit area. However, due to power constraints, in the future increasing the CPU frequency may only deliver modest performance improvements. Further, it is becoming increasingly difficult to reduce the size of transistors due to the limitations of lithographic processes and material capabilities.

In addition, the speed of the main Random Access Memory (RAM) on a computer motherboard has increased much more slowly than has the speed of CPUs over the past few years. This has led to a phenomenon known as the "memory wall" or, in other words, the memory speed is the limiting factor in the computer system.

An alternative approach to increase the speed of a computer system for specialist computing applications is to use additional or specialist hardware accelerators. These hardware accelerators increase the computing power available and concomitantly reduce the time required to perform the calculations.

A suitable system is a stream processing accelerator having a dedicated local memory. The accelerator may be located on an add-in card which is connected to the computer via a bus such as Peripheral Component Interconnect Express (PCI-E). The bulk of the numerical calculations can then be handled by the specialised accelerator. Stream processor accelerators can be implemented using, for example, Field-Programmable Gate Arrays (FPGAs), Application Specific Integrated Circuits (ASICs) and/or structured ASICs. In certain cases, such arrangement may increase the performance of highly parallel applications by over an order of magnitude or more.

A number of different numerical arithmetic formats are available for use by the accelerator hardware in order to perform the iterative numerical calculations. Two commonly used numerical formats are floating point arithmetic and fixed point arithmetic.

The floating-point data format representation is used to represent numbers which cannot be represented as integers. Floating-point format numbers are in general represented to a fixed number of significant digits and scaled using an exponent. Floating-point representation is similar in concept to scientific notation. The base for the scaling is normally 2, 10 or 16. The typical number that can be represented exactly is of the form:

$$M \times B^e$$

Where M is known as the "mantissa", B is the base and e is the exponent. The mantissa M comprises a digit string of a given length in a given base B. The radix point is not explicitly included, but is implicitly assumed to lie in a certain position within the mantissa—often just after or just before the most significant digit, or to the right of the rightmost digit. The length of the mantissa determines the precision to which numbers can be represented.

The mantissa is multiplied by the base B raised to the power of the exponent e. If B is the base for the mantissa, then this operation is equivalent to shifting the radix point from its implied position by a number of places equal to the value of the exponent—to the right if the exponent is positive or to the left if the exponent is negative. Alternatively, the B may differ from the base of the mantissa for example, the mantissa could be binary but B=4.

The term "floating-point" relates to the ability of the radix point (or decimal point) to "float". By this is meant that the radix point can be placed anywhere relative to the significant digits of the mantissa. A number of different floating-point representations have been used in computers. However, an increasingly adopted standard is that defined by the IEEE 754 Standard.

The IEEE 754 standard provides for many closely-related formats, differing in only a few details. The most common of these formats are single precision and double precision.

Single precision is a binary format that occupies 32 bits (4 bytes) and its mantissa has a precision of 24 bits (about 7 decimal digits). Any integer with absolute value less than or equal to $2^{24}$ can, therefore, be exactly represented in the single precision format.

Double precision is a binary format that occupies 64 bits (8 bytes) and its mantissa has a precision of 53 bits (about 16 decimal digits). Therefore, any integer with absolute value less than or equal to $2^{53}$ can be exactly represented in the double precision format.

A variation on conventional floating point representation is the block floating point representation. In block floating point representation, a block of data is assigned a single exponent rather than each data word having its own exponent, as in conventional floating-point. The exponent is typically determined by the data element in the block with the largest magnitude.

Conventional CPUs generally provide floating point arithmetic functionality. This is because floating point arithmetic is general purpose, is suitable for most numerical applications and is easy-to-use because it requires minimal understanding of the data representation by the programmer. Whilst floating point arithmetic units are very expensive to implement in hardware because they require a relatively large logic area, in a conventional CPU, these units make up only a small part of the total chip area, so this disadvantage is outweighed by the advantages.

In contrast, a fixed-point data format representation comprises a number having a fixed number of digits after (and sometimes also before) the radix point (or decimal point). The fixed-point data format comprises an integer scaled by a specific scale factor determined by the type. For example, in order to represent the binary value 1.01, the fixed point binary number 1010 could be used with binary scaling factor of 1/1000. Generally, the scaling factor is the same for all values of the same type, and does not change during a computation. In most computational uses, the scaling factor is generally a power of two for use with binary notation. However, other scaling factors may be used.

Fixed point arithmetic units have an advantage over floating point units in that they require significantly less logic area to implement in hardware. For example, consider a fixed point adder consisting of an "add block" that combines two inputs to produce one output. On an FPGA, combining 32-bit inputs typically requires 32 look-up tables (LUTs) although this is dependent upon the implementation methodology and FPGA architecture.

However, in contrast, a floating point adder for IEEE 754 single precision 32-bit floating point requires three computational stages: 1) to align the smaller input to the same exponent as the larger number, requiring the use of a barrel shifter; 2) to add the two mantissas (a fixed-point add); and 3) to normalize the result to the top of the floating point mantissa and calculate the exponent for the result, requiring another barrel shifter. In total, around 400-600 LUTs may be required to perform the same calculation in floating point format as approximately 32 LUTs in fixed point format.

Therefore, it is apparent that the use of fixed point calculations translates into a significant reduction in silicon area for a given number of functions implemented on-chip. Consequently, many types of stream processor, for example those based around field-programmable gate arrays (FPGAs), may be able to deliver more computational performance for fixed point (fixed range) numbers than for floating point. Since floating point arithmetic units require significantly more logic area on chip to implement than fixed point arithmetic units, more fixed point units can be implemented in parallel in the same silicon area. It is therefore beneficial to use fixed point data representations and fixed point calculations in order to achieve maximum performance.

Further, in many computational applications, the approximate range of the data is understood. For example, modelling a physical process such as wave propagation that obeys certain physical laws such as conservation of energy will result in mean values which are always smaller than an initial maximum value. Since the total energy is constant, the mean and maximum amplitudes of the waves will decrease as they propagate through the medium. Therefore, the extra number range provided by the floating point format (which may, for example, in IEEE 754 single precision format provide a range between $+/-10^{39}$) is unnecessary, and some of the available range is wasted. Consequently, for situations where the number range used is known, the fixed point format is more resource-efficient.

However, there are disadvantages to the use of the fixed-point data format which have, to date, prevented fixed-point numerical units from finding widespread use in iterative numerical computational hardware. Fixed point data, by its very nature, lacks range flexibility and may lead to errors in calculations. Two situations in which errors may occur are in the cases of underflow and overflow.

Underflow to zero occurs when a data value becomes too small to be represented differently from zero, and is rounded to zero. This leads to a loss of precision since small values that should still contribute to the result of the computation are lost. Underflow-to-zero has a negative effect on the accuracy of a computation that is related to the nature of the computation and the number of and significance of the data values lost—in general, it is advantageous to minimize underflow.

In contrast, overflow occurs when a data value becomes too large to be represented. In floating point, such a value will become infinite. However, in fixed point, unless special overflow detection is implemented, an invalid result will be produced. For example, if two large positive numbers are added, a negative result could be returned. Overflow is often catastrophic, introducing completely incorrect values into the computation that lead to the result of a computation being worthless.

Both underflow and overflow are more important issues for fixed point computation having a particular bit-width than for floating point computation. This is because of the inherently smaller dynamic range supported by the number representation.

Therefore, in order to make use of fixed point data in scientific computation, overflow must be prevented and underflow minimised. These objectives are generally opposed to each other; for example, although overflow can be prevented by moving bits from the least-significant part of the number to the most significant, providing "space" for the number to get larger, this will increase underflow.

To summarise, floating-point units require significant silicon area, and may provide unnecessarily large ranges and/or precision which are not required for the computational task. This is wasteful of valuable on-chip area. On the other hand, fixed-point units require less silicon area but lack numerical range flexibility. Thus, fixed-point units may be prone to generate errors in numerical calculations if the range limits are exceeded.

WO 00/07114 relates to a Fast Fourier Transform (FFT) processor in which an FFT is computed by a number of processing stages. The output of each stage is checked for increasing values. If the values grow larger than a predetermined threshold then a scaling factor is applied to avoid subsequent overflow.

However, FFT computations comprise a small number of processing stages applied iteratively (typically 2-20) and results in maximum values which always grow in magnitude. Underflow does not occur in an FFT calculation and so the FFT scaling hardware is unsuitable for use in modelling applications, where underflow must be minimised and which may comprise tens of thousands of iterative steps.

Therefore, to date, known numerical computation formats and associated hardware have suffered from the technical problem that neither floating point nor fixed point arithmetic units are ideally suited to iterative numerical calculations on specialised hardware.

According to a first aspect of the invention, there is provided a method of processing an iterative computation on a computing device comprising at least one processor, the method comprising: performing, on a processor, an iterative calculation on data in a fixed point numerical format having a scaling factor, wherein the scaling factor is selectively variable for different steps of said calculation in order to prevent overflow and to minimise underflow.

By providing such a method, the reliability, precision and flexibility of floating point operations can be achieved whilst using fixed point processing logic. The errors which fixed-point units are usually prone to generate if the range limits are exceeded can be mitigated, whilst still providing the advantage of a significantly reduced logic area to perform the calculations in fixed point.

In another embodiment, the method comprises selecting the scaling factor for a particular step in dependence upon the resulting values of a previous step of the calculation.

In another embodiment, the method comprises selecting said scaling factor for a particular step in dependence upon the maximum magnitude of said resulting values.

In another embodiment, the method comprises selecting a scaling factor in dependence upon the position of the most significant non-zero bit of said resulting values.

In one embodiment, the method comprises applying a predetermined change to the scaling factor with each step the iterative calculation.

In a variation, the value of said predetermined change is the same for each step of the iterative calculation.

In an example, the value of the predetermined change is selected in dependence upon a predicted change in the magnitude of the data with each step of the iterative calculation.

In one example, said data comprises a plurality of arrays, each array having the same scaling factor during a step of the iterative calculation.

In an example, said step of performing comprises: inputting data to a processor;
scaling said inputted data using said scaling factor; calculating, on a processor, a step of a numerical computation in a fixed point format using said scaled data; updating, using a processor, the scaling factor based upon the resulting values of said calculation of said step, said updated scaling factor being greater than, less than or equal to a previous scaling factor; and repeating the steps of inputting, scaling, calculating and updating for the next step of said numerical computation using said updated scaling factor.

In a variation, said step of inputting comprises inputting data in either fixed point or floating point formats.

In another variation, if floating point data is inputted at said inputting step, further comprising, subsequent to said scaling step, converting said floating point data to fixed point data.

In one example, said updating comprises scaling said data for said next step by an amount equal to the difference between said scaling factor for said next step and the currently-applied scaling factor from the previous step.

In one embodiment, said computing device comprises a central processing unit and a further processor.

In a variation, said central processing unit and further processor communicate across a data bus.

In a further variation, said further processor is located on an accelerator card connected to said data bus.

In one configuration, said accelerator card further comprises a local memory associated with said further processor.

In one example, said further processor comprises a stream processor.

In a further example, said stream processor comprises a field programmable gate array.

In one embodiment, said scaling factors are calculated by said central processing unit.

In a further embodiment, said steps of scaling and updating further comprise sending, from said central processing unit, data comprising the difference between said scaling factor for said next step and the currently-applied scaling factor from the previous step to said further processor.

In one embodiment, the method further comprises, after said steps of calculating, storing, in a local memory of said further processor, the results of said numerical computation in a fixed point format.

In one example, said steps of inputting, scaling, calculating and updating are performed by said further processor.

In another example, the method further comprises the step of outputting at least some of said resulting values from said further processor to said central processing unit.

In a variation, said step of outputting comprises updating said data to remove said currently-applied scaling factor.

In a variation, the scaling factor is implemented as a power of two. This enables changes to the scaling factor between steps to be implemented as a shift.

In a further variation, scale factor S can be stored as $\log_2 S$ and said step of updating comprises adding or subtracting from the scale factor $\log_2 S$.

According to a second aspect of the invention, there is provided a processor operable to process an iterative computation on a computing device, said processor being operable to perform calculations in a fixed point numerical format having a scaling factor, wherein the scaling factor is selectively variable for different steps of said calculation in order to prevent overflow and to minimise underflow.

By providing such an arrangement, the reliability, precision and flexibility of floating point operations can be achieved whilst using fixed point processing logic. The errors which fixed-point units are usually prone to generate if the range limits are exceeded can be mitigated, whilst still providing the advantage of a significantly reduced logic area to perform the calculations in fixed point.

In one example, the processor is further operable to select the scaling factor for a particular step in dependence upon the resulting values of a previous step of the calculation.

In another example, the processor is further operable to select a scaling factor in dependence upon the maximum magnitude of said resulting values.

In one variation, the processor is further operable to select a scaling factor in dependence upon the position of the most significant non-zero bit of said resulting values.

In one embodiment, the processor is further operable to apply a predetermined change to the scaling factor with each step of the iterative calculation.

In a variation, the value of said predetermined change is the same for each step of the iterative calculation.

In one arrangement, the value of the predetermined change is selected in dependence upon a predicted change in the magnitude of the data with each step of the iterative calculation.

In one embodiment, said data comprises a plurality of arrays, each array having the same scaling factor during a step of the iterative calculation.

In a variation, the processor is further operable to perform said calculations by: inputting data to a processor; scaling said inputted data using said scaling factor; calculating a step of a numerical computation in a fixed point format using said scaled data; updating the scaling factor based upon the resulting values of said calculation of said step, said updated scaling factor being equal to, greater or less than said previous scaling factor; and repeating the steps of inputting, scaling, calculating and updating for the next step of said numerical computation using said updated scaling factor.

In one arrangement, the processor is further operable to input data in either fixed point or floating point formats.

In a further arrangement, if floating point data is inputted, the processor is further operable to convert said floating point data to fixed point data.

In a variation, said scaling comprises scaling said data for said next step by an amount equal to the difference between said scaling factor for said next step and the currently-applied scaling factor from the previous step.

In one arrangement, there is provided a computing device comprising a central processing unit and a processor.

In one arrangement, said central processing unit and processor communicate across a data bus.

In a variation, said processor is located on an accelerator card. In a further variation, said accelerator card further comprises a local memory associated with said processor.

In one arrangement, said processor comprises a stream processor. In a further variation, said stream processor comprises a field programmable gate array.

In one example, said scaling factors are calculated by said central processing unit.

In a further example the computing device is further operable to send, from said central processing unit, data comprising the difference between said scaling factor for said next step and the currently-applied scaling factor from the previous step to said further processor.

In another example the computing device is further operable to, after said steps of calculating, store, in a local memory of said processor, the results of said numerical computation in a fixed point format.

In a variation, the computing device is further operable to output at least some of said resulting values from said processor to said central processing unit.

In a further variation, the computing device is further operable to rescale said data to remove said currently-applied scaling factor before outputting said resulting values.

According to a third aspect of the invention, there is provided a computing device comprising: a central processing unit; and a further processor, the further processor being operable to perform numerical computations comprising a plurality of stepwise iterations in a fixed point numerical format having a scaling factor; and said central processing unit being operable to determine the scaling factor for the next step based upon the resulting values of a previous step.

By providing such an arrangement, the CPU can be used to handle complex control decisions or algorithms such as calculation of an appropriate scaling factor. Therefore, there is no need for the further processor to handle such matters and the further processor can be used purely to process large volumes of numerical computational data.

In one example, said central processing unit is further operable to select the scaling factor for a particular step in dependence upon the resulting values of a previous step of the calculation.

In another example, said central processing unit is further operable to select a scaling factor in dependence upon the maximum magnitude of said resulting values.

In a variation, said central processing unit is further operable to select a scaling factor in dependence upon the position of the most significant non-zero bit of said resulting values.

In one arrangement, said central processing unit is further operable to apply a predetermined change to the scaling factor with each step the iterative calculation.

In a further arrangement, the value of said predetermined change is the same for each step of the iterative calculation.

In a variation, the value of the predetermined change is selected in dependence upon a predicted change in the magnitude of the data with each step of the iterative calculation.

In a further variation, said data comprises a plurality of arrays, each array having the same scaling factor during a step of the iterative calculation.

In one arrangement, said further processor is further operable to perform said calculations by: inputting data to a processor; scaling said inputted data using said scaling factor; and calculating a step of a numerical computation in a fixed point format using said scaled data; and wherein said central processing unit is further operable to update the scaling factor based upon the resulting values of said calculation of said step, said updated scaling factor being greater or less than said previous scaling factor; said computing device being operable to repeat the steps of inputting, scaling, calculating and updating for the next step of said numerical computation using said updated scaling factor.

In a variation, said further processor is further operable to receive inputted data in either fixed point or floating point formats.

In an example, if floating point data is inputted to said further processor, said further processor is further operable to convert said floating point data to fixed point data.

In another example, said further processor scales said data for said next step by an amount equal to the difference between said scaling factor for said next step and currently-applied scaling factor from the previous step.

In one arrangement, said central processing unit and further processor communicate across a data bus.

In another arrangement, said further processor is located on an accelerator card.

In a variation, said accelerator card further comprises a local memory associated with said further processor.

In a further variation, said further processor comprises a stream processor.

In one arrangement, said stream processor comprises a field programmable gate array.

In a variation, the computing device is further operable to output at least some of said resulting values from said further processor to said central processing unit.

In one arrangement, the scaling factor is selected to prevent overflow and to minimise underflow.

According to a fourth aspect of the invention, there is provided a method of performing an iterative computation on a computing device comprising a central processing unit and a further processor, the method comprising: performing, on said further processor, numerical computations comprising a plurality of stepwise iterations in a fixed point numerical format having a scaling factor; determining, on said central processing unit, the scaling factor for the next step based upon the resulting values of a previous step.

By providing such a method, the CPU can be used to handle complex control decisions or algorithms such as calculation of an appropriate scaling factor. Therefore, there is no need for the further processor to handle such matters and the further processor can be used purely to process large volumes of numerical computational data.

According to a fifth aspect of the invention, there is provided a computer program product executable by a programmable processing apparatus, comprising one or more software portions for performing the steps of the first to third aspects.

According to a sixth aspect of the invention, there is provided a computer usable storage medium having a computer program product according to the fourth aspect stored thereon.

BRIEF DESCRIPTION OF DRAWINGS

Embodiments of the invention will now be described in detail with reference to the accompanying drawings, in which:

FIG. 2 is a schematic diagram of an FPGA stream processor forming part of the accelerator card of FIG. 1;

FIG. 3 is a schematic diagram showing a programmable logic block forming part of the FPGA stream processor of FIG. 2;

DETAILED DESCRIPTION

Figure 1:
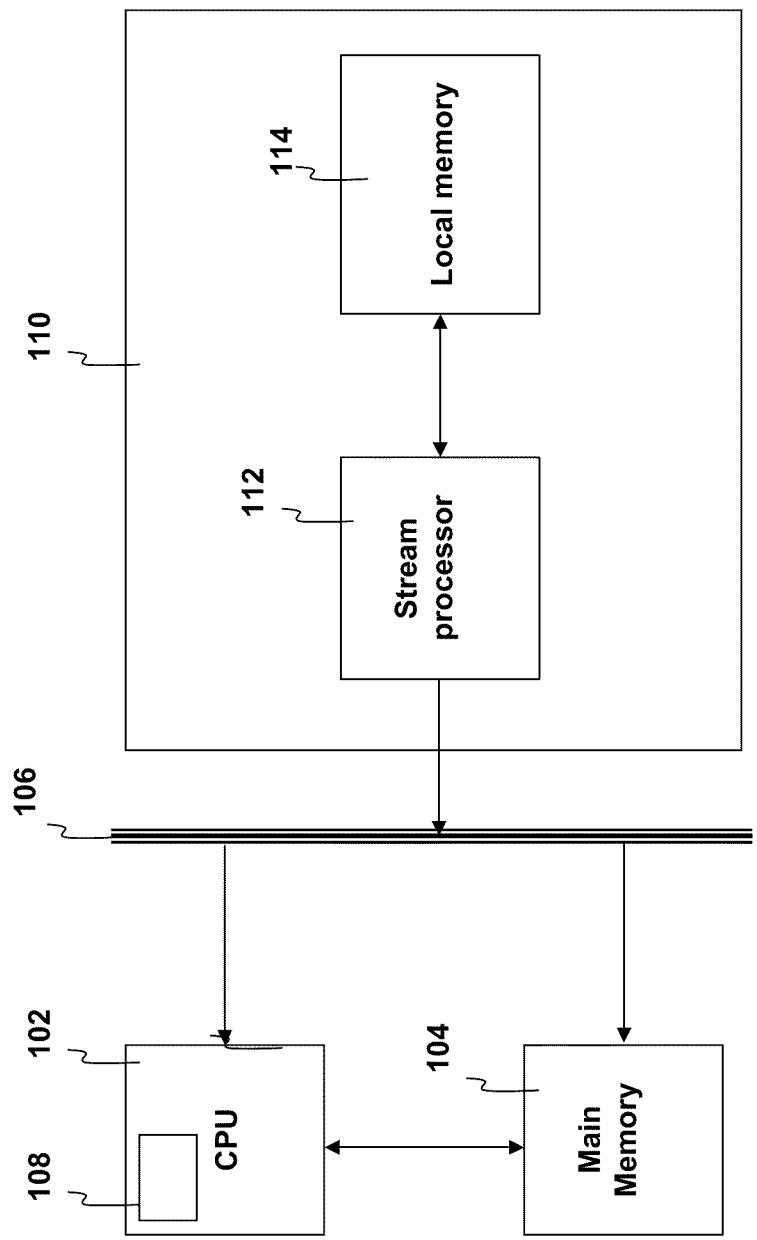
FIG. 1 is a schematic diagram of a computing device including an accelerator card.

FIG. 1 shows a schematic view of a computing device 100. The computing device 100 comprises a Central Processing Unit (CPU) 102, a main memory 104 and a data bus 106.

The CPU 102 may take any suitable form and comprises a processor for carrying out the instructions of a computer program run on the computing device 100. The CPU 100 is the primary element carrying out the functions of the computing device 100 as is well known in the art. The CPU 102 is commonly located on a motherboard (not shown) which comprises the necessary contacts to supply the CPU 102 with power and to connect the CPU 102 to other component in the computing device 100.

The CPU 102 further comprises a cache 108. The cache 108 is an area of local memory which is available to the CPU 102 for processing of data. The cache 108 generally comprises Random Access Memory (RAM). Generally, the cache RAM takes the form of Static RAM (SRAM) in which bits of data are stored in the state of a flip-flop. The cache 108 may be split into a plurality of levels. Since the cache 108 is local to the CPU 102, input/output (I/O) operations to the cache 108 from the CPU 102 are very fast.

The main memory 104 is associated with the CPU 102 and comprises an area of RAM. The RAM may take the form of SRAM, Dynamic RAM (DRAM) in which bits of data are stored as a charge in a capacitor or transistor gate, or any other suitable memory type. As is common for many computing applications, the main memory 104 may be provided as a plurality of SRAM or DRAM modules. These modules can quickly be replaced should they become damaged or when greater storage capacity is required. The main memory 104 is able to communicate with the CPU 102 via the motherboard forming part of the computing device 100.

The data bus 106 enables additional devices to be connected to the computing device 100 and to communicate with components of the computing device 100. The data bus 106 may take any suitable form, for example a Peripheral Component Interconnect Express (PCI-E) data bus. The data bus 106 acts as a motherboard-level interconnect to link motherboard-mounted peripherals and as an expansion card interface for add-in cards.

In this embodiment, the computing device 100 further comprises an accelerator card 110. The accelerator card 110 is configured to connect to the data bus 106 and may be, for example, a PCI-E format expansion board comprising interconnects suitable for connecting to a PCI-E data bus.

Whilst, for clarity, only a single accelerator card 110 is included in the following example, it would be readily apparent to the skilled person that additional accelerator cards may be included to provide additional computational power. For example, four accelerator cards may be included in parallel or series within one system, with each card communicating to the CPU 102 and to each other.

The accelerator card 110 comprises a stream processor 112 and a local memory 114. The local memory 114 is configured for fast access by the stream processor 112 and may comprise simple flip-flops or more complete blocks of memory such as Embedded Block RAM memory. For iterative numerical computation, it is beneficial to store data in the faster local memory 114 compared to the slower main memory 104. Data can be transferred into the accelerator local memory 114 once at the beginning of an iteration and the final result transferred out at the end of an iteration. Each iteration may be then able to run more quickly due to the data being loaded and stored to/from the faster local memory for the actual computation.

In this embodiment, the stream processor 112 comprises an FPGA-based processor. Different types of FPGA processors may be used, however the larger and more arithmetic function-rich FPGAs are more desirable. FIG. 2 shows a schematic diagram of a stream processor 112 in the form of an FPGA. Recent research work has shown that FPGAs can provide a customized solution for specific applications and can achieve an increase in speed of more than two orders of magnitude compared to a single core software implementation.

The FPGA stream processor 112 is an integrated circuit which is configurable after manufacture. The FPGA stream processor 112 comprises a programmable semiconductor device which comprises a matrix of configurable logic blocks (CLBs) 116 connected via programmable reconfigurable interconnects 118 (shown here as the shaded area in FIG. 2). The configuration of the FPGA interconnects 118 are usually specified using a hardware description language (HDL). The HDL is generally similar to that used for an application-specific integrated circuit (ASIC). In order to get data into and out of the FPGA stream processor 112, a plurality of input pads 120 and output pads 122 are provided.

The CLBs 116 are the basic logic unit of the FPGA 112. A schematic diagram of a typical CLB 116 is shown in FIG. 3. The CLB 116 comprises a configurable switch matrix comprising typically a 4 or 6 input look up table (LUT) 124, some specialist circuitry (such as, for example, a multiplexer), one or more flip-flop units 126 which act as temporary memory storage and an output 128.

The switch matrix of each CLB 116 can be configured to perform a variety of functions; for example, logic gates such as NAND and XOR, or more complex functions. A typical FPGA may comprise up to $10^5$ LUTs. The CLBs 116 are able to operate in parallel, providing a powerful resource for numerically-intense calculations.

FPGA-based processors comprise calculation functions mapped into circuit units along the path from input to output. The FPGA then performs the computation by streaming the data items through the circuit units. The streaming architecture makes efficient utilization of the computation device, as every part of the circuit is performing an operation on one corresponding data item in the data stream at any point during the calculation.

Figure 4:
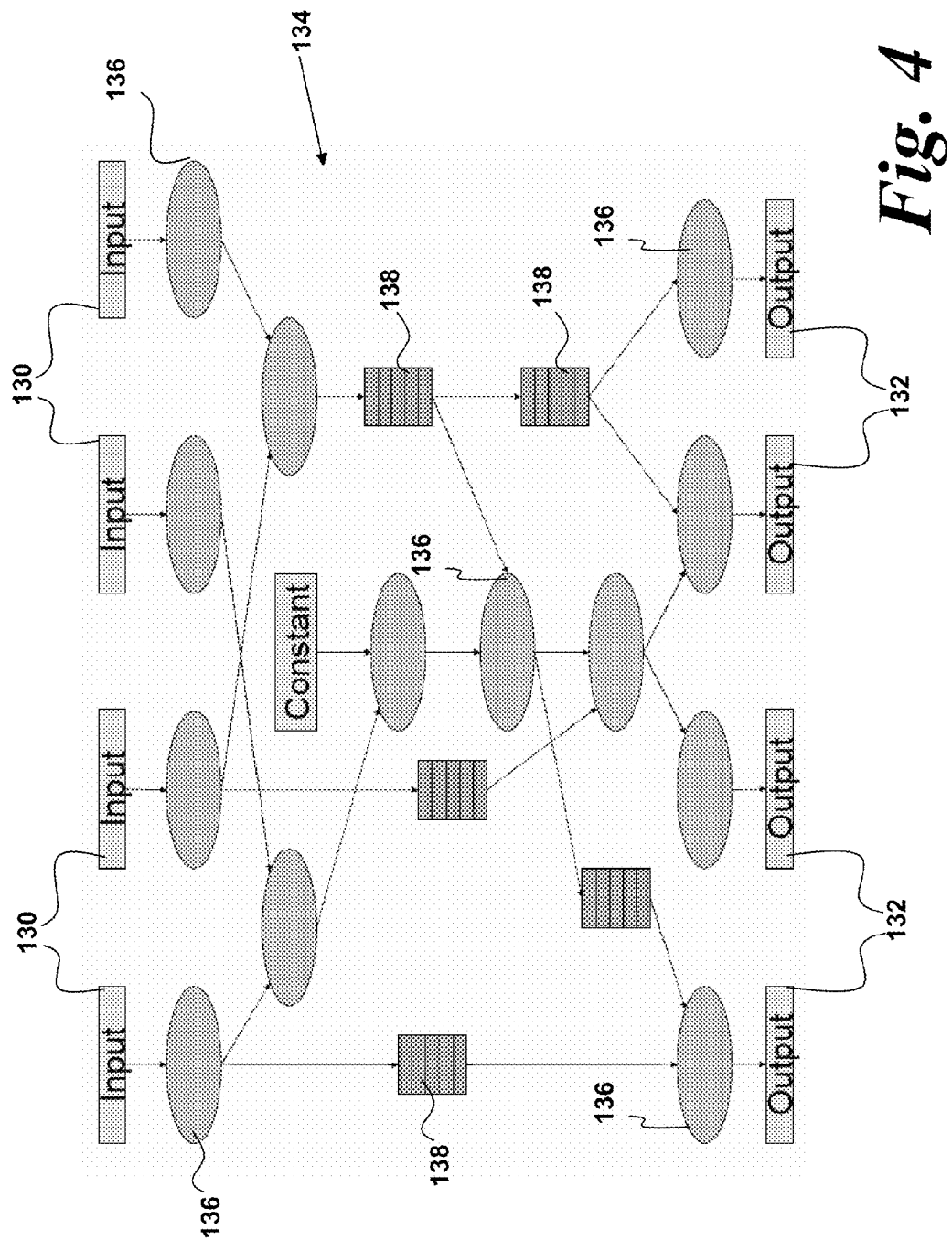
FIG. 4 is a schematic diagram of the computation structure of the FPGA stream accelerator of FIG. 2.

FIG. 4 shows an example of such a streaming architecture created using the CLBs 116 of the FPGA stream processor 112. FIG. 4 shows a 4 input 130-$i$, 4 output 132 stream computing engine which can be implemented on the FPGA stream processor 112.

Between the inputs 130-$i$ and the outputs 132 is provided a computational datapath 134. The computational datapath 134 is implemented in the CLBs 116 and comprise arithmetic operations 136 (performed in one or more LUTs 124) and buffer memories 138. As shown, the computational datapath 134 is arranged to process data in parallel.

In operation, the data is streamed through the CLBs 116 of the FPGA stream processor 112 and the arithmetic operations 136 are carried out on the data as it is streamed. This is in contrast to conventional processors in which instructions are generally processed sequentially, although some limited parallelism may possible on some processors. Data is saved to cache during this process and movement of data is directed by the program operating on the CPU.

Figure 5:
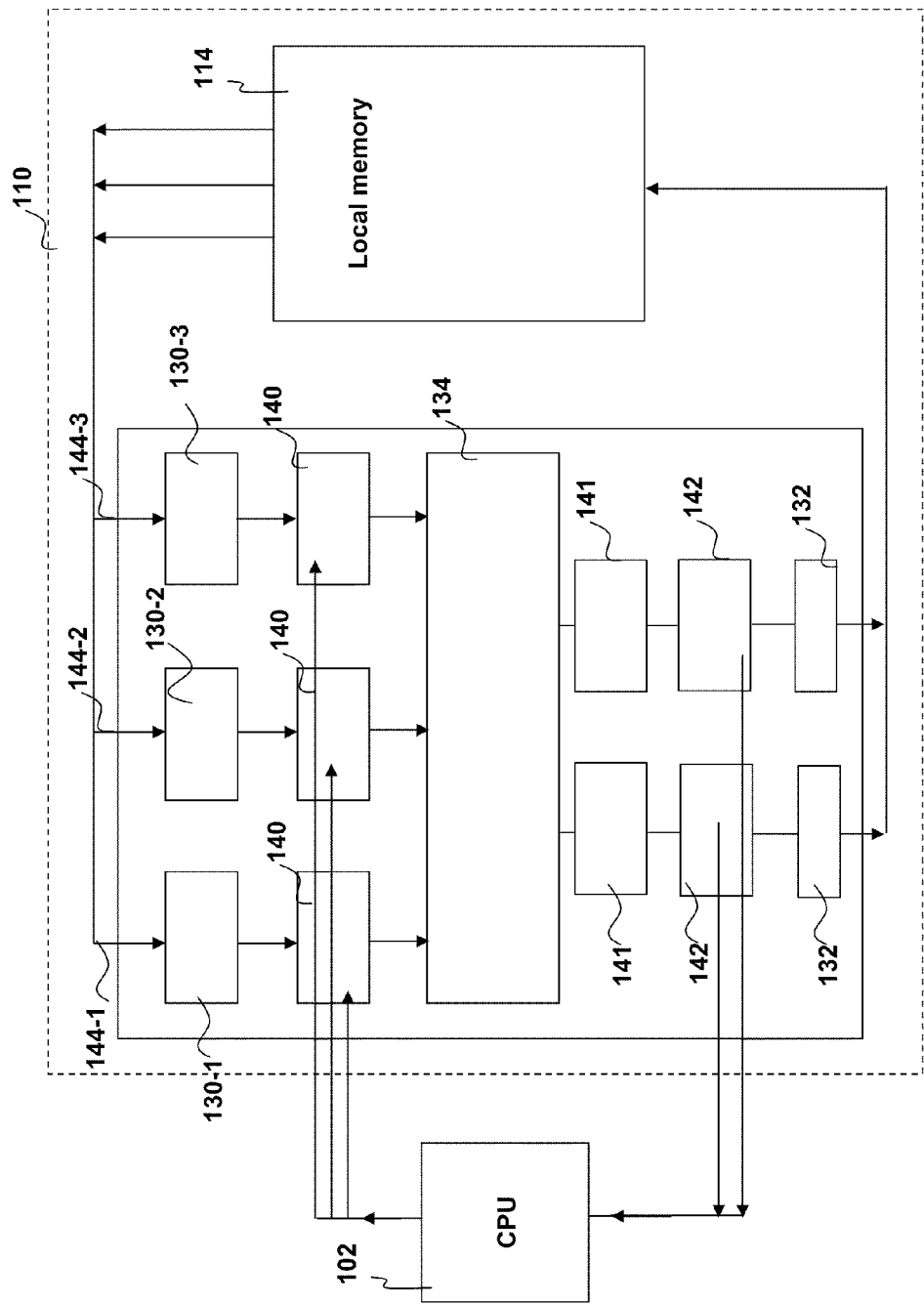
FIG. 5 is a more detailed schematic diagram of the accelerator card shown in FIG. 1.

FIG. 5 shows the configuration of the stream processor 112 and local memory 114 according to an embodiment of the invention. The FPGA stream processor 112 comprises, as shown in FIG. 4, a plurality of array inputs 130-$i$, outputs 132 and a computational datapath 134. The arrangement shown in FIG. 5 further comprises a plurality of input alignment units 140 (one input alignment unit 140 for each array input 130-$i$) upstream of the computational datapath 134, a plurality of output alignment units 141 (one per output) downstream of the computational datapath 134 and a plurality of stream read-out registers 142 (one stream read-out register 142 per output). It is to be understood that the input alignment units 140 and/or the output alignment units 141 may take any suitable form; for example, they may be implemented as separate units on the stream processor 112, or may simply be integrated to form a part of the computational datapath 134 if so desired. In FIG. 5, the main memory 104 and data bus 106 are not shown for clarity.

The array inputs 130-$i$ (where i=1, 2, 3 . . . ) are configured to be loaded with array data 144-$i$ (where i=1, 2, 3 . . . ) from the local memory 114. The array data 144-$i$ will usually be in fixed point format. Alternatively, the array data 144-$i$ may originate from the CPU 102 or main memory 104 and be transferred across the data bus 106 to the array inputs 130-$i$. Therefore, some input array data 144-$i$ may be in floating point format.

The stream processor 112 is operable to perform calculations in fixed-point format. Therefore, usually, all of the data within the computational datapath 134 of the stream processor 112 is in the fixed point format. The use of fixed point calculations is particularly suited to FPGA stream processors because they are able to deliver more computational performance for fixed point (fixed range) numbers than for floating point. Since floating point arithmetic units require significantly more logic area on chip to implement than fixed point arithmetic units, more fixed point units can be implemented in parallel in the same silicon area. It is therefore beneficial to use fixed point data representations and fixed point calculations in order to achieve maximum performance within the stream processor 112. However, occasionally, it may be useful to provide hybrid fixed point/floating point computational datapaths in order to effect certain computational methodologies.

In order to interpret the fixed point data, an exponent or scaling factor is required for each array 144-$i$. Therefore, the input alignment units 140 are required to align the data to the correct values. An input alignment unit 140 is provided for each input data array 144-$i$ introduced through the array inputs 130-$i$. The input alignment units 140 are used to adjust a scaling factor or shift (i.e. the exponent of the data values) for each array 144-$i$ so that the numerical values within each array fall within a range to prevent overflow and minimise underflow.

The values in each array 144-$i$ thus appear as fixed point numbers to the computational datapath 134, enabling few logic units to be used to process a given function or calculation, whilst the scaling factor selection provides the advantageous flexibility of floating point values, namely the prevention of overflow and minimisation of underflow. The arrangement of this embodiment may be thought of as "pseudo-fixed point" processing since the scaling factor for each array 144-$i$ is variable and is handled independently of the mantissa.

In the case of floating point data inputted from the CPU 102 or main memory 104, this floating point input array data 144-$i$ is passed through a respective input alignment unit 140 and the floating point data is multiplied by a predetermined alignment factor (if the alignment factor is a power of two, the adjustment can be carried out by adjusting the floating point exponent) and then converted to fixed point by the respective input alignment unit 140. The ability of the input alignment unit 140 to process floating point data is particularly important when some data may be transmitted from the CPU 102 as floating point data and is required to be combined with fixed point data on the accelerator card 110.

The scaling factor for each array 144-$i$ is stored on the CPU 102. Each scaling factor describes the exponent of that array 144-$i$ relative to some fixed reference point that is common to all of the arrays 144-$i$. The fixed reference point may comprise, for example, an arbitrary value such as 0.0 or any other suitable point. The skilled person would be readily aware of the types or values of reference points that may be suitable. Depending upon the values in each array 144-$i$, each array 144-$i$ may potentially have a different scaling factor, depending upon the magnitude of the result of the calculation performed therein.

Further, the scaling factors are variable for each step of the iterative computation. This is so that, as the computation proceeds, the fixed point values are kept within a range which prevents overflow and minimises underflow. The range selected will depend upon the values in the calculation. For example, in the case of modelling wave propagation through a medium, if the magnitude of the oscillations in the medium are initially quite large, then the fixed point scaling factor will need to be chosen to prevent overflow.

However, as the wave propagates through the medium over time, it will disperse and the maximum values will decrease to a small proportion of the initial magnitude. Therefore, if the scaling factors for the arrays at such later times are not adjusted appropriately, the fixed point representation will become increasingly inaccurate and will ultimately result in underflow rounding the values to zero. At this point, the results are essentially meaningless.

The CPU 102 calculates the required scaling factor $S'_n$ for the computation in step n, based on at least one of the following factors:

1. The current scaling factor $S_{n-1, i}$ of each input array i as stored (i.e. the scaling factor of the data stored in the local memory 114 from the previous, $(n-1)^{th}$, iteration); and
2. The actual maximum values for each input array as determined by the CPU 102 monitoring the stream read-out registers 142 during the previous iteration n−1; and Further, other factors may also be used to determine the scaling factors for the next step. For example, the determination may be based on information on how the arrays are combined e.g. whether, for example, the outputted arrays from one step of the iteration are added or multiplied together before being input back into the computational datapath for the next step of the iteration. The CPU 102 will also take into consideration the computation in the computational datapath 134 and the likely values to arise from the computational processes carried out on the inputted data.

The scaling factor $S'_n$ for the $n^{th}$ step is then chosen to prevent overflow but also to minimize underflow to zero for all input arrays array 144-$i$ by ensuring that all fixed point bits used on-chip are effectively utilized.

To apply the scaling factor $S'_n$, the respective input alignment unit 140 is operable to apply an alignment multiplicand $A1_n$, to the respective array 144-$i$. The alignment $A1_n$, takes into account the current scaling factor $S_{n-1, i}$ which was output from the preceding (n−1th) step for each array 144-$i$ (and is the scaling factor in which each array 144-$i$ is stored in the local memory prior to step n). In other words, the alignment multiplicand $A1_{n, i}$ represents the difference between the scaling factor $S_{n-1, i}$ output from the preceding $n-1^{th}$ step and the desired scaling factor for the $n^{th}$ step $S'_n$. The alignment value $A1_{n, i}$ for array 144-$i$ in step n of the iteration will be calculated as:

$$A1_{n,i}=S'_n/S_{n-1,i}$$

The scaling factor $S'_n$, for step n is determined by the CPU 102 and the required alignment $A1_{n, i}$ for each array 144-$i$ is sent to the input alignment units 140 via the data bus 106. Then, the alignment values $A1_{n, i}$ are multiplied by the input array data 144-$i$ in the input alignment units 140 in order to ensure that the data in each array 144-$i$ is aligned to the correct scaling factor $S'_n$ for that step of the computation. Therefore, prior to the data passing through the computational datapath 134 of the stream processor 112, all of the input array data 144-$i$ has been aligned to the desired scaling factor $S'_n$ for array 144-$i$ that is required for the $n^{th}$ step of the computation.

Commonly, values of the scaling factors and alignment multiplicands may be restricted to powers of two, in which case the alignment operation consists of a shift, rather than a full multiplication.

Once the alignment $A1_{n, i}$ has been performed, the data is then streamed through the computational datapath 134. The data is usually streamed in fixed point format, although other formats (such as floating point) may be used for some or all of the computational datapath 134 as required. The computational datapath 134 is similar in format to the computational datapath shown in FIG. 4 and comprises arithmetic operations which modify the data streamed therethrough.

The general effect of the computational datapath 134 on the data streamed therethrough may be known. For example, it may be known that the maximum magnitude of the data outputted from the computational datapath 134 is, on average, about 4 times smaller than the maximum magnitude of the data inputted to the computational datapath 134. In that case, this can be taken into account and the average reduction can be statically coded in the computational datapath.

The static change is implemented as a further alignment multiplicand $A2_{n,i}$ by the output alignment units 141 located downstream of the computational datapath 134.

The further alignment $A2_{n, i}$ is applied to the data already having the scaling factor $S'_n$ for each array 144-$i$ through the computational datapath 134. In other words, the alignment multiplicand $A2_{n, i}$ is a static value multiplied by scaling factor $S'_n$ output from the computational datapath 134. Therefore, the outputted data has a scaling factor $S_{n, i}$ which is calculated based upon:

$$S_{n,i}=S'_n \times A2_{n,i}$$

Once the data has been passed through the output alignment units 141, the data has a scaling factor $S_n$. This value can be determined by the CPU 102 by performing the above calculation, i.e. the CPU 102 has knowledge of the static shift $A2_{n, i}$ and the value of the scaling factor $S'_n$ applied prior to the data passing through the computational datapath 134.

The stream read-out registers 142 are located downstream of the computational datapath 134 and are configured to enable each output array to be monitored for a particular numerical property as it is written out to the local memory 114. In this embodiment, the particular property that the resulting data values are checked for comprises either the maximum magnitude of the data values in the output array or the position of the most significant non-zero bit in each output array.

This data is monitored by the CPU 102 via the read-out registers 142 as the data is streamed from the computational datapath 134 to the local memory 114. Once all the data for a particular time step has been streamed, the CPU 102 logs the respective data property and the maximum values or position of the most significant non-zero bit are stored as metadata in the CPU 102 for each output array.

The CPU 102 can then use the appropriate data property (e.g. the maximum magnitude value or the position of the most significant non-zero bit) to determine the scaling factor $S'_{n+1}$ that will be used in the next step n+1 of the iterative computation. By collecting these values at the end of iterative step n, and computing scaling factors $S'_{n+1}$ for use in the next step, multiple load/stores of the data are avoided. It is only metadata that is passed via the bus 106 at this stage of the calculation.

Once the required scaling factor $S'_{n+1}$ for the $n+1^{th}$ step has been calculated, the CPU 102 can then determine the required alignment multiplicand $A1_{n+1, i}$ to be transmitted to the input alignment units 140. The alignment multiplicand $A1_{n+1, i}$ is, thus, determined to be:

$$A1_{n+1,i}=S'_{n+1}/S_{n,i}$$

The alignment multiplicand $A1_{n+1, i}$ for step n+1 can then be applied to the array data 144-$i$ in order to obtain data which is scaled to the desired scaling factor $S'_{n+1}$ for that step.

As described above with reference to the stream processor 112, the local memory 114 stores the results of computations by the stream processor 112 in fixed point format with a pre-determined scaling factor $S_{n,i}$ for a particular array after a particular iteration n.

Figure 6:
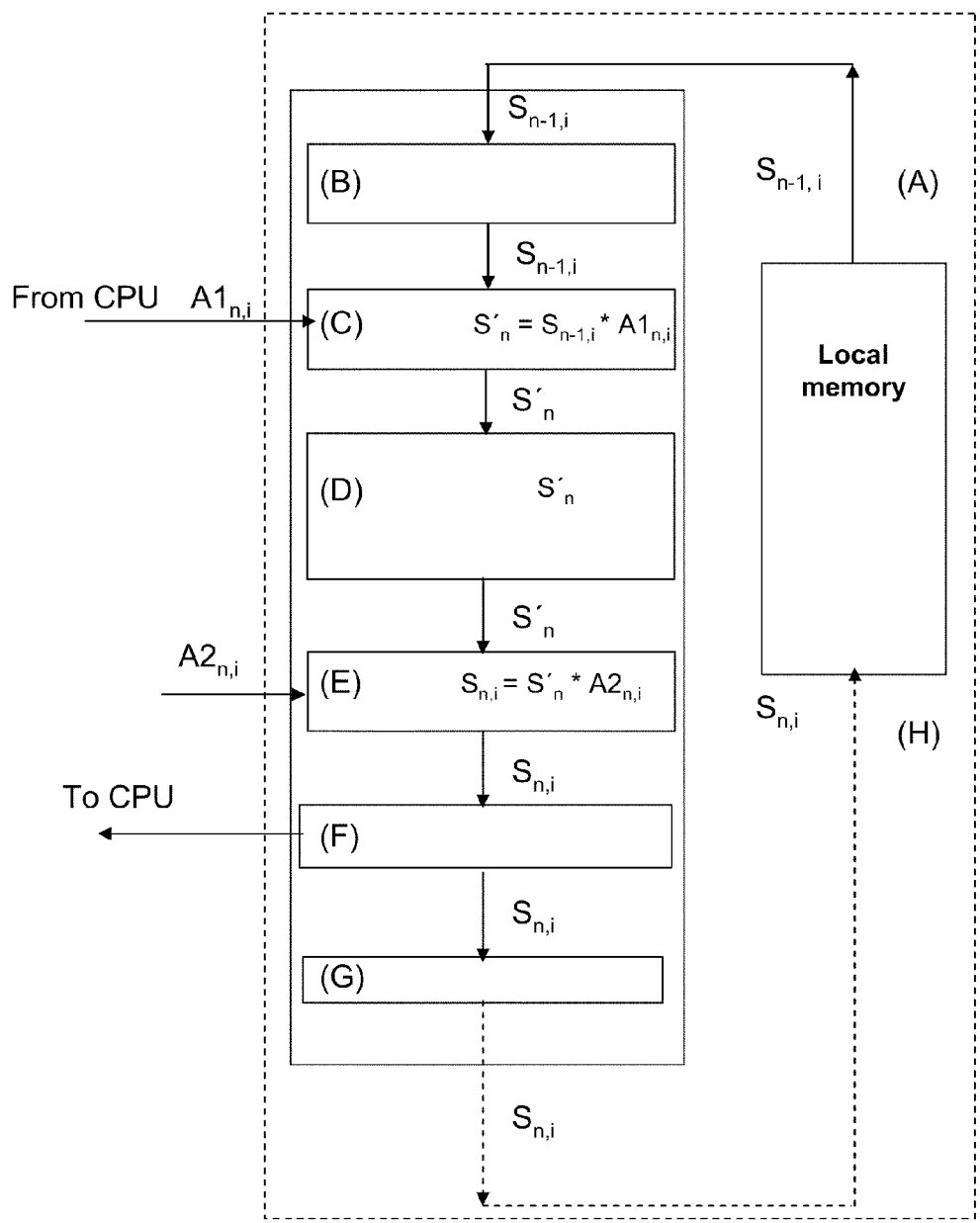
FIG. 6 is a schematic showing the different scale factors used at different points within the stream accelerator of FIG. 2.

The scaling factors used at each point in a typical calculation cycle as data passes through the streaming processor 112 are shown in FIG. 6 for step n of the calculation. In FIG. 6, for clarity, only one input and one output is shown, and the CPU has been omitted.

At point (A), data from the previous step n−1 of the calculation is retrieved from the local memory 114. This data is stored with a scaling factor $S_{n-1}$ which is the scaling factor of the data output from stream processor 112 during the previous step of the calculation.

The data, still having a scaling factor $S_{n-1}$ is then inputted to the input port 130 at point (B). The data is then passed to the input alignment unit 140 at point (C). In the input alignment unit 140, the data is then scaled to a predetermined scale factor $S'_n$ which was previously determined by the CPU 102. The scaling is achieved by applying an alignment multiplicand $A1_n$ to the data having scaling factor $S_{n-1}$ in order to produce data having a scaling factor $S'_n$.

The data having scaling factor $S'_n$ is then passed through the computational datapath 134 at point (D). After the computational datapath 134, the data then passes through the output alignment unit 141 at point (E). At this point, the data is then scaled by a static scaling factor A2 to produce data having a scaling factor $S_{n+1}$. The scaling factor A2 is applied based on empirical knowledge of the general effect of the computational datapath 134 on the magnitude of data passing therethrough.

The data is then passed through the stream read-out register 142 (point (F)) and output 130 (point (G)), and then saved back to the local memory 114 at point (H) with the same scaling factor S. For the next $((n+1)^{th})$ step, the cycle begins at point (A) with the scaling factor $S_n$ and so on.

At some point it may be required to output the data from the accelerator card 110, e.g. for use by the CPU 102. This may be done at any suitable point, for example, at the end of a step of an iteration or series of steps. The data may be output either straight from the FPGA stream processor 112 or from the local memory 114 via the stream processor 112. However, in either case, the data will need to be placed in floating point format for interpretation by the CPU 102. Therefore, the scaling factor $S'_n$ must be such that the scale can be applied and removed consistently, e.g. such that $f(x)=f(S'_n x)/S'_n$.

In order to determine and apply the scaling factor $S'_n$, only small amounts of control metadata needs to be transferred to/from the CPU 102 across the data bus 106 in order to apply the alignment multiplicand $A1_{n,i}$ to the array data 144-$i$. This is advantageous because the data bus 106 is often the slowest "data pipeline" in the computing device 100. Therefore, large amounts of data can be processed by the accelerator card 110 and transferred between the stream processor 112 and the local memory 114 whilst only a small amount of data is transferred over the relatively slow data bus 106.

Figure 7:
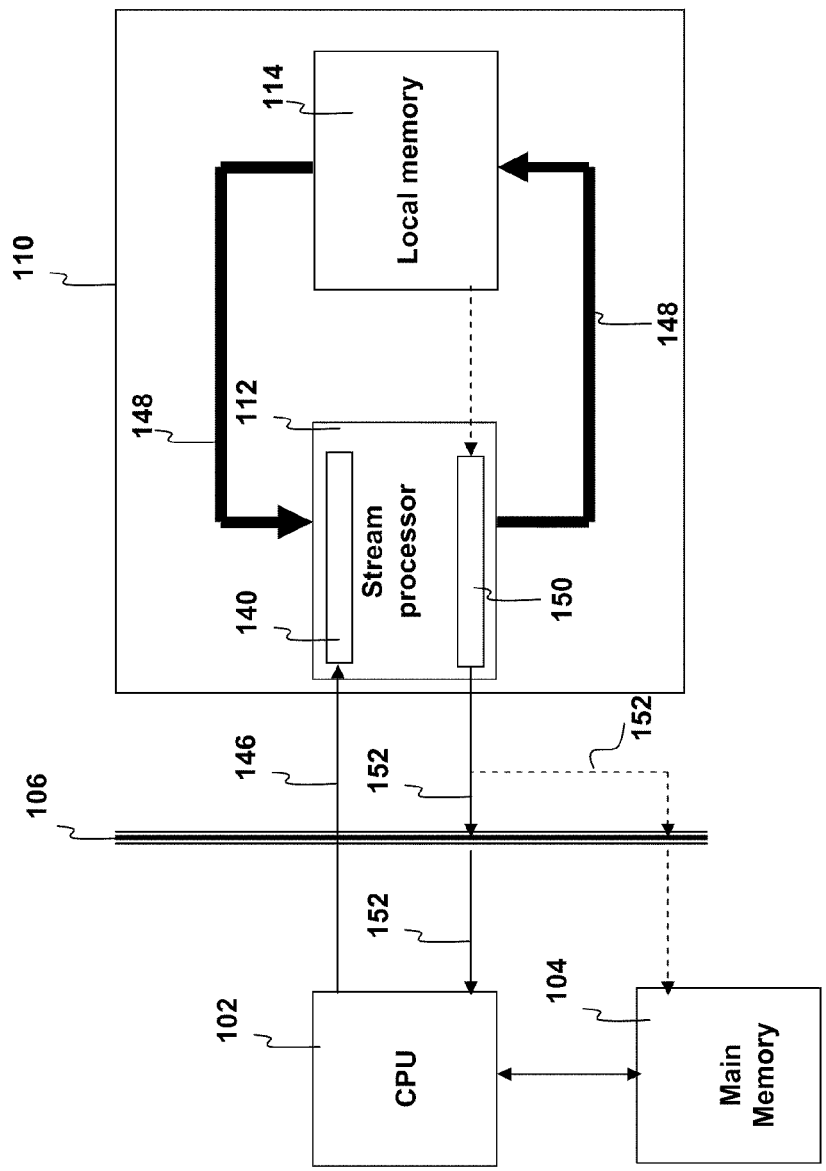
FIG. 7 is a schematic showing the dataflow in the computing device during a typical step of an iterative calculation.

This is illustrated by FIG. 7. FIG. 7 shows a simplified schematic diagram of the computing device 100 to show a typical dataflow in the computation of a time step. Only the CPU 102, data bus 106 and a simplified version of the accelerator card 110 are shown in FIG. 7.

The computation input and output data is split into two parts, one that is stored in the local memory 114 on the accelerator card 110 and one that is stored in the main memory 104. In order to minimise the time spent transferring data it must be ensured that most of the data is stored in the local memory 114 of the accelerator card 110 and only a small amount is transferred across the (relatively slow) data bus 106 to/from the CPU 102.

While the bulk of the data for each array 144-$i$ is stored in the accelerator local memory 114, metadata 146 for the array 144-$i$ is stored in the cache 108 of the CPU 102 or in the main memory 104. The volume of metadata 146 is small relative to the total data volume; for example, whilst each array may comprise computational data 148 having millions or billions of data values (of the order of Gigabytes), there may only a few metadata 146 values (of the order of a few bytes per iteration).

As shown in FIG. 7, the stream processor 112 exchanges metadata 146 with the CPU 102 across the data bus 106. This metadata 146 typically comprises the maximum values of the data stream in each array during a computation or the position of the most significant non-zero bit. The metadata 146 may also comprise details of, for example, which values are associated with which array 144-$i$. The metadata 146 typically comprises a small amount of data and has a size of the order of bytes. Therefore, this small amount of data can be sent across the relatively slow data bus 106 to and from the CPU 102 without significant time penalty.

By holding metadata 146 on the CPU 102, the CPU 102 can be used to operate complex control decisions or algorithms. Therefore, there is no need to place complicated "decision-making" hardware on the accelerator card 110 itself. Metadata 146 values can be calculated by the accelerator 110 and then transferred to the CPU 102 for processing and control operations.

In contrast, large amounts of computational data 148 are sent between the accelerator local memory 114 and the stream processor 112. This computational data is typically of the order of Gigabytes. However, extremely fast transfer times between the stream processor 112 and the local memory 114 minimises the time required to perform an iteration.

The metadata 146 and computational data 148 can be described by an iterative process such as:

(Metadata Output,Computational Data Output)=PROCESS (Metadata Input,Computational Data Input)

Therefore, the iterative process described above enables the use of fixed point data with scaling factors determined for the next iteration at least in part by the results of the previous iteration.

By sharing data between the CPU 102 and the accelerator card 110, complex and irregular decision making can take place on the CPU 102 while repetitive and intensive array calculations take place on the stream processor 112. Decision making by the CPU 102 is based mostly on data values that are collected at almost zero performance cost by the stream processor 112. For example, the stream maximum/maxima can be collected by the stream maximum registers 142 on the stream processor 112 without any performance impact since it is simply added at the end of the streaming computational datapath 134.

Further, the ability of the CPU 102 to determine the required scaling factor for each iteration and for each array 144-$i$ enables both overflow prevention and underflow minimisation. These aspects are key for providing accurate, useable results from numerical computation methods using fixed point numerical analysis.

Since the CPU 102 will typically be using floating point data, data output from the accelerator 110 is converted to floating point and "de-scaled" on the stream processor 112 in a descaling unit 150 before being sent to the CPU 102 as conventional floating point data 152. Usually there is more receiver data than source data during a computation.

Figure 8:
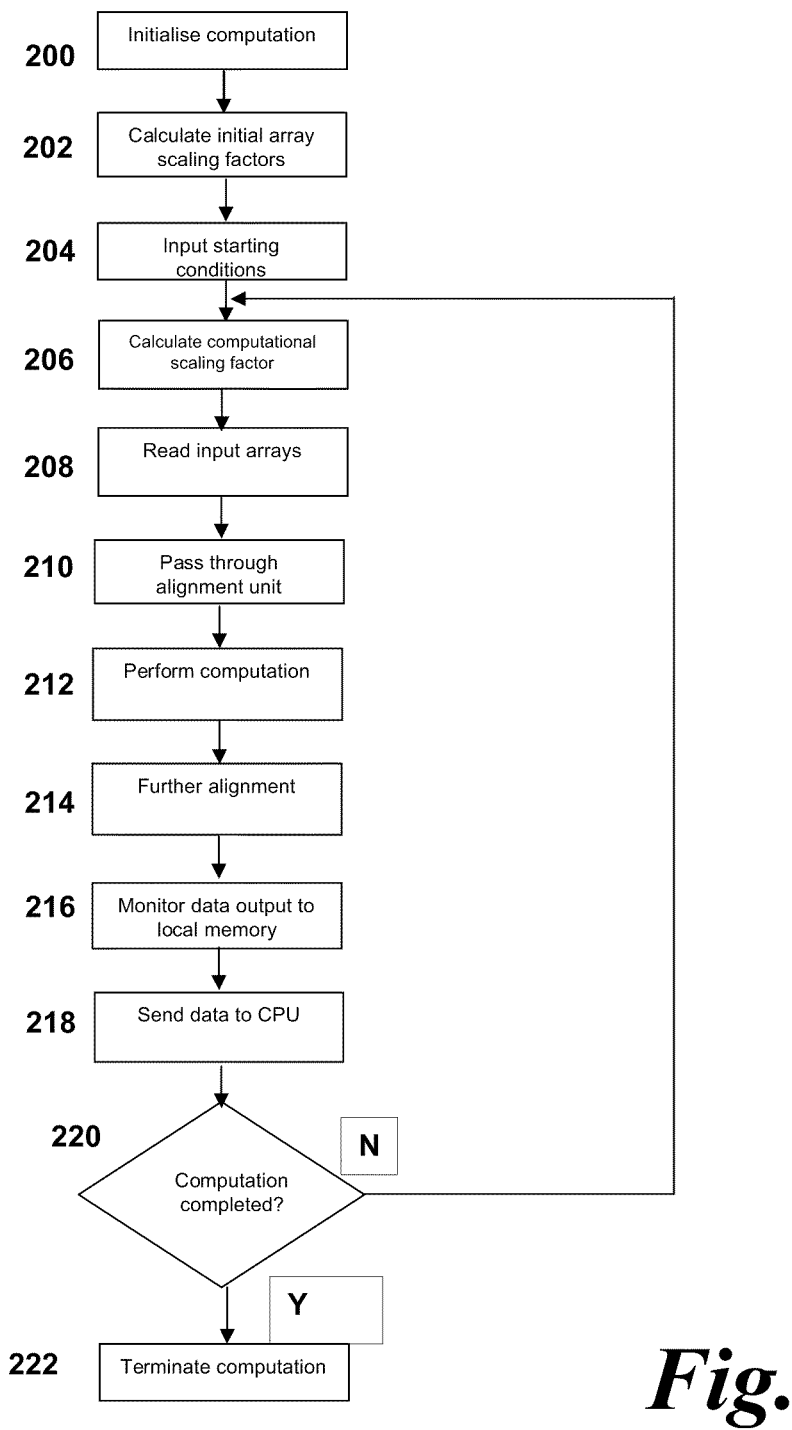
FIG. 8 is a flow diagram showing the operation of the computing device of FIG. 1.

A method according to an embodiment of the invention will now be described with reference to FIGS. 7 and 8.

The method and apparatus according to an embodiment of the invention is configured to perform iterative numerical calculations. Iterative computations are split into a large (typically in the range of 100 to 10000) number of steps. Each step usually corresponds to the same or similar calculation.

The following example is described with reference to numerical calculations of wave propagation in a medium.

However, the skilled person would be readily aware of other numerical calculations which could be performed using the method and apparatus according to the invention.

In the exemplary method described below, the invention is applied to the computation of 3D wavefield "forward modelling" by finite difference utilising convolution. Forward modelling computes the propagation of a wave through a medium. It does this by maintaining state of one or more pressure fields at a particular time point, and using the current and previous state(s) to compute the state at the next time point. The wavefield is computed at a plurality of closely-spaced grid points by approximating the derivatives occurring in the equation of motion with finite difference formulas and recursively solving the resulting difference equation.

Step 200: Initialise Computation

At step 200, the computation is started. At this point, the CPU 102 runs the program which initialises the iterative numerical computation. The program defines a three-dimensional block of a medium. The medium is then broken up into smaller segments; for example, each length dimension may be broken up into 1000 grid points. Therefore, the total number of grid points is $1000^3$ or $1 \times 10^9$.

The program also initialises the necessary computational steps to calculate the physical dispersion of a wave through the medium. The time-dependence of the dispersion of the wave is calculated by dividing the required run time of the simulation (for example, 8 to 10 seconds) into a plurality of time-steps. Then, an iterative numerical calculation can be performed for each time step.

Each timestep of the computation may be split into one or more "passes", each of which reads and writes different arrays. Alternatively, the stream processor 112 may be configured to calculate multiple timesteps per pass through the computational datapath 134. However, in the present example a single pass is used to compute the wavefield for a given time pass from the "current" and "previous" wavefields. Wavefield arrays are held in the accelerator local memory 114.

The pressure fields are initialized to zero at the start. From time zero, for some number of steps, a "source wavelet" is added to the wavefields. This source is an array of size which is much less the total size of the wavefield. This may be, for example, a single plane of a 3D field, sized 1000×1000, or a small 3D volume sized 3×3×3, compared to a total wavefield size of 1000×1000×1000. The source is localized but has high amplitude so the wavefield range must represent the large amplitude source data without overflow.

The first time-step will generally comprise an impulse applied at a specific point on the medium. For example, in the case of simulation of wave propagation through a solid medium, the impulse may be applied at a point on the "surface" of the solid medium to simulate, for example, a disturbance, an impact or an explosion. Thereafter, time-steps will calculate the dispersion and propagation of the initial impulse through the medium.

Step 202: Calculate Initial Array Scaling Factors and Other Metadata

At this point, the CPU 102 calculates the scaling factor $S_{0,i}$ desired for each input array i. The initial scaling factor $S_{0,i}$ for each pressure field input can be calculated by the CPU 102 based on, for example, the maximum value in the initial data that is being sent onto the accelerator card 110 and/or based on knowledge of the processes which will be performed on the data as it is streamed through the computational datapath 134. Where the input pressure fields are initialized to zero, $S_{0,i}$ can take any value since 0×S=0 for all values of S. The CPU 102 also determines and stores other initial metadata for each input array i, for example the maximum magnitude value present in each array.

Step 204: Input Starting Conditions to Accelerator Card Local Memory

The CPU 102 then sends the starting values for the iterative computation to the local memory 114 of the accelerator card 110. This is done through the data bus 106.

The starting values are usually in fixed-point format because this is the format used by the stream processor 112. However, the starting values stored in local memory 114 may alternatively comprise floating-point data. This is particularly important if the data stored in the accelerator card local memory 114 is data received from the CPU 102. This is because the CPU 102 processes values in floating-point format.

The method then proceeds to step 206.

Step 206: Calculate Computational Scaling Factor for Step

In step 206, the scaling factor $S'_n$ which all arrays 144-i are to be aligned to for the computation in a given iterative step are determined by the CPU 102.

The CPU 102 uses array metadata, together with other factors described previously, to compute the scaling factor $S'_n$ for the $n^{th}$ time step. For steps where n>1, some metadata (for example, the maximum magnitude value present in the array) will have been read out from the read-out registers 142 during step 216 (described later). For step n=1, the metadata will be as initially determined by the CPU 102. Once the CPU 102 has determined the desired scaling factor $S'_n$ for the $n^{th}$ time step, given knowledge of the scaling factors $S_{n-1,i}$ in which the array data 144-i is currently stored, the alignment multiplicand $A1_{n,i}$ can be determined (and which is then applied in step 210).

The method proceeds to step 208.

Step 208: Read Input Arrays from Local Memory

At step 208, the input arrays 144-i are read from the local memory 114 and are fed into the array inputs 130-i.

The input arrays 144-i may comprise whatever data is required for the computation. For the first step (i.e. n=1), the arrays 144-i may also comprise data which is arbitrarily scaled with a scaling factor $S_{0,i}$. Whilst 3 input arrays 144-i are shown in FIG. 5, any number of arrays may be used as required by the computation to be performed. For one implementation of finite difference modelling, the next state of the model is calculated using the current state, the previous state and an earth model. Therefore, a minimum of three arrays are required for this example of finite difference modelling. However, different numbers and arrangement of state variables could be used for different modelling schemes.

During iterative steps where n>1 (i.e. all steps after the first step), the output data from the $n^{th}$ step having scaling factor $S_{n-1,i}$ (as saved to local memory in step 216 during step n−1) is used as the input data for the $n^{th}$ step. This data is input to the array inputs 130-i as input array data 144-i.

The output data from the previous, $(n-1)^{th}$ step may comprise only part of the data input for the next step. For example, data may be input from the CPU 102 or read-only arrays such as an earth model array may be input. As previously described, the calculation of the next state of the wavefield may comprise the following function:

$$\text{State\_next} = f(\text{state\_current}, \text{state\_previous}, \text{earth\_model})$$

In this function, only the state_current array data may have been carried over from the previous calculation step.

The method then proceeds to step 210.

Step 210: Pass Input Data Through Alignment Unit

Since the data is in the fixed point format, it needs to be scaled appropriately. The input alignment unit 140 (FIG. 5) forming part of the accelerator card 110 is used to adjust the exponents of the data values for each array so that they fall within a range to prevent overflow and minimise underflow.

The scaling factor $S'_n$, is applied to the input data in this step. The scaling factor $S'_n$, is the same for each array 144-$i$ and is determined in step 206. The scaling factor $S'_n$ for the $n^{th}$ step is chosen to prevent possible overflow but also to minimize underflow to zero by ensuring that all fixed point bits used on-chip are effectively utilized.

The alignment multiplicand $A1_{n,i}$ is then the difference between the current scaling factor $S_{n-1,i}$ for each array 144-$i$ of data stored in the local memory (from the previous step n−1) and inputted to the stream processor in step 208, and the desired scaling factor $S'_n$ for step n. Therefore, the actual applied multiplicand for iteration n and for array 144-$i$, $A1_{n,i}$, is determined as:

$$A1_{n,i} = S'_n / S_{n-1,i}$$

The required alignment multiplicand $A1_{n,i}$ for each array 144-$i$ (which is the difference between the current scaling factor of the inputted array data 144-$i$ and the desired scaling factor $S'_n$ for all arrays in step n) is sent from the CPU 102 to the input alignment unit 140. The input alignment unit 140 then applies the required alignment multiplicand $A1_{n,i}$ to each array 144-$i$.

Therefore, once on the computational datapath 134 of the stream processor 112, all of the arrays 144-$i$ have been aligned to the respective scaling factor $S'_n$ that is required for this stage of the computation, preventing overflow and minimising underflow.

Note that some input arrays 144-$i$ may be in floating point format, and can still be passed through the input alignment units 140, where they are aligned to the scale factor $S'_n$ prior to being converted to fixed point. This is particularly important when some data may be being transmitted from the CPU as floating point data and combined with fixed point data on the stream processor 112.

The aligned data is then passed through to the computational datapath 134 of the stream processor 112. All data passing through the computational datapath 134 on the stream processor 112 is in the fixed point format. The method then proceeds to step 212.

Step 212: Perform Computation

At step 210, the aligned data from the input alignment units 140 is passed through a pipelined computational datapath 134 within the stream processor 112. Each array 144-$i$ passing through the computational datapath 134 has been aligned to the scaling factor $S'_n$ and so the arrays 144-$i$ can be combined within the computational datapath 134 if required.

The computational datapath 134 is determined by the appropriate programming of the stream processor 112 prior to use, as shown in the example given in FIG. 4.

By providing enough silicon area to implement the computational datapath 134, the computation is executed in approximately the same amount of time as it takes to "stream" the data through the stream processor 112. This is because the computation happens as the data moves through the pipelined computational datapath 134. It is, of course, possible to add additional computation to the datapath without affecting the speed of computation, provided there is spare silicon area. The computational datapath 134 is a conventional fixed point datapath.

The computation of the next state of the model may be, for example, based upon the current state of the model, the previous state of the model and the properties of the wavefield environment, e.g. the earth model. The finite difference calculation of the next state wavefield in a medium may, thus, be expressed as:

State_next=$f$(state_current,state_previous,earth_model)

Once the computation has been performed on the aligned input data in the arrays, the method progresses to step 214.

Step 214: Apply Further Alignment Multiplicand

The data leaving the computational datapath 134 has a scaling factor $S'_n$. However, the general effect of the computational datapath 134 on the data streamed therethrough may be known. For example, it may be known that the maximum magnitude of the data outputted from the computational datapath 134 is, on average, about 4 times smaller than the maximum magnitude of the data inputted to the computational datapath 134. In that case, this can be taken into account and the average reduction can be statically coded in the computational datapath.

The static change is implemented as a further alignment multiplicand $A2_{n,i}$ by the output alignment units 141 located downstream of the computational datapath 134. The further alignment multiplicand $A2_{n,i}$ is applied to the data already having the scaling factor $S'_n$ for each array 144-$i$ through the computational datapath 134. In other words, the alignment multiplicand $A2_{n,i}$ is a static value applied to scaling factor $S'_n$ output from the computational datapath 134. Therefore, at the end of step 212, the outputted data has a scaling factor $S_{n+1,i}$ which is calculated based upon:

$$S_{n,i} = S'_n \times A2_{n,i}$$

Once the data has been passed through the output alignment units 141, the data in each array 144-$i$ has a scaling factor $S_{n,i}$. This value can be determined by the CPU 102 by performing the above calculation, i.e. the CPU 102 has knowledge of the static shift $A2_{n,i}$ and the value of the scaling factor $S'_n$ applied prior to the data passing through the computational datapath 134.

The method now progresses to step 214.

Step 216: Monitor Data Output to Local Memory

As data is passed from the computational datapath 134 to be stored in the local memory 114, the read-out registers 142 are monitored by the CPU 102 and the maximum value of the data values in each of the arrays is stored as metadata by the CPU 102. Alternatively, instead of the maximum values, the CPU 102 may also monitor the most significant non-zero bit.

These maximum values are used to compute the scaling factor $S'_{n+1}$ that will be applied to each array 144-$i$ during the next, n+1, step of the computation. By collecting the maximum values at the end of one step, and computing scaling factors $S'_{n+1}$ for use in the next step, multiple load/stores of the data are avoided.

The array data is then stored in the local memory 114 with a scaling factor $S_{n,i}$ determined in step 206 and applied in step 210.

The method then proceeds to step 218.

Step 218: Send Data to CPU

As the computation proceeds, some "receiver" data may be read back to the CPU 102. This may comprise a subset of the complete current wavefield or may comprise the entire wavefield set.

Since the CPU 102 will typically be using floating point data, this data is converted to floating point and "de-scaled" on the FPGA using the descaling unit 150 before being sent to the CPU 102 as conventional floating point data 152. Therefore, data is rescaled only when entering or leaving the stream processor 112.

Whilst this step has been described as occurring after the step of calculating scaling factors for the next step, the skilled person would readily appreciate that this step can be carried out at any suitable point in the calculation, and may be carried out for every step or only some of the steps.

The method then proceeds to step 220.

Step 220: Computation Completed?

At step 220, it is determined whether the computation has been completed. If more time steps are required to be completed, then the method proceeds back to step 206. The next state of the wavefield is then computed. Since this is an iterative process, the method then proceeds back to step 206 whereby the next state of the wavefield is computed based upon the current and previous states.

The iterative process continues until all of the time steps have been computed. Once the source wavelet has been injected in the first few time steps, the later time steps then model the propagation of the resulting wave through the medium being modelled.

As the wave propagates through the medium, it will disperse and generally reduce in amplitude (although under certain conditions constructive interference can occur which may increase the maximum amplitude from one iteration step to the next). However, generally, the energy in the wavefield becomes more diffuse and lower amplitude with increasing time step.

Consequently, the recalculation of the computational scaling factor with each step ensures that the features of gradually decreasing amplitude continue to be well represented (i.e. are prevented from being rounded to zero by underflow errors). In the embodiment of the invention, the wavefield exponents will gradually be adjusted by the CPU 102 to ensure that the bits used to store the wavefield are always efficiently utilized.

Whilst the changed scaling factor means that the exponent of the wavefield at later times may no longer be suitable for representing the high magnitude values that were present at the beginning of the computation, this is not a problem because such values are no longer present in this calculation.

Since the data is a wave propagation over time, changes in maximum data magnitude between each step are small and the CPU 102 can adjust the scaling factor S gradually to handle situations where the maximum value increases in some cases (for example, if two low amplitude waves constructively interfere).

If all of the time steps have been completed, then the method proceeds to step 222.

Step 222: Terminate Calculation

At step 222, the calculation of all of the time steps is completed and the process is terminated.

Variations of the above embodiments will be apparent to the skilled person. The precise configuration of hardware and software components may differ and still fall within the scope of the invention. For example, whilst the invention has been described with reference to FPGA architecture, this need not be so. ASIC architecture, or any other processor type may be used.

Further, the accelerator need not be located on a card attached to a bus. The accelerator may, indeed, in some embodiments form part of a CPU or other processor within a computing system, or may be located on a motherboard with the CPU. Additionally, as discussed, multiple accelerator cards may be provided. Each card may be connected in parallel or in series and may be capable of communicating with the CPU or with other cards via the data bus or other connection.

The alignment multiplicands may occur at different points in the computational process to that described. Further, there need not be two alignment multiplicands and one may optionally be used. Additionally, instead of a static alignment multiplicand, a dynamic alignment multiplicand which has an adjustable value may be implemented. This may be done via the CPU or by any other suitable method.

Further, the scale factors may be implemented in factors of two (i.e. in $\log_2$). This enables the alignment multiplicands A1 and A2 to be applied as shifts.

Embodiments of the invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the invention.

The invention claimed is:

1. A method of processing an iterative computation on a computing device comprising at least one processor by performing, on a stream processor, an iterative calculation on data in a fixed point numerical format having a scaling factor that is selectively variable for different steps of the calculation in order to prevent overflow and to reduce underflow, the method comprising:
   inputting a plurality of arrays of data to the stream processor;
   scaling each array to a common scaling factor selected to prevent overflow and reduce underflow;
   calculating, by the stream processor, a step of a numerical computation in a fixed point format using the scaled array data;
   applying a predetermined change to the scaling factor with each step of the iterative calculation, the value of the predetermined change being the same for each step of the iterative calculation;
   updating, using a processor, the scaling factor based upon the resulting values of the calculation step; and
   repeating the steps of inputting, scaling, applying, and updating for the next step of the numerical computation using the updated scaling factor.

2. The method according to claim 1, comprising selecting the scaling factor for a particular step in dependence upon the resulting values of a previous step of the calculation.

3. The method according to claim 2, comprising selecting the scaling factor for a particular step in dependence upon the maximum magnitude of the resulting values or in dependence upon the position of the most significant non-zero bit of the resulting values.

4. The method according to claim 1, wherein the value of the predetermined change is selected in dependence upon a predicted change in the magnitude of the data with each step of the iterative calculation.

5. The method according to claim 1, wherein the updating comprises scaling the data for the next step by an amount equal to the difference between the scaling factor for the next step and the currently-applied scaling factor from the previous step.

6. The method according to claim 1, wherein the computing device comprises a central processing unit and a further processor.

7. The method according to claim 6, wherein the further processor comprises a stream processor.

8. The method according to claim 7, wherein the stream processor comprises a field programmable gate array.

9. The method according to claim 6, comprising calculating the scaling factors by the central processing unit.

10. The method according to claim 9, wherein the steps of scaling and updating further comprise sending, from the central processing unit, data comprising the difference between the scaling factor for the next step and the currently applied scaling factor from the previous step to the further processor.

11. The method according to claim 6, further comprising, after the steps of calculating, storing, in a local memory of the further processor, the results of the numerical computation in a fixed point format or a floating point format.

12. The method according to claim 6, comprising performing the steps of inputting, scaling, calculating and updating by the further processor.

13. A computing device comprising a stream processor operable to process an iterative computation, the stream processor being operable to perform calculations in a fixed point numerical format having a scaling factor that is selectively variable for different steps of the calculation in order to prevent overflow and to reduce underflow, the computing device to:
input a plurality of arrays of data to the stream processor;
scale each array to a common scaling factor selected to prevent overflow and to reduce underflow;
cause the stream processor to calculate a step of a numerical computation in a fixed point format using the scaled array data;
apply, using the stream processor, a predetermined change to the scaling factor with each step of the iterative calculation, the value of the predetermined change being the same for each step of the iterative calculation;
update, using a processor, the scaling factor based upon the resulting values of the stream processor calculation; and
repeat the input, scale, cause, apply, and update steps for the next step of the numerical computation using the updated scaling factor.

14. The processor according to claim 13, further operable to select the scaling factor for a particular step in dependence upon the resulting values of a previous step of the calculation.

15. The processor according to claim 14, further operable to select a scaling factor in dependence upon the maximum magnitude of the resulting values or in dependence upon the position of the most significant non-zero bit of the resulting values.

16. The computing device according to claim 13, wherein the processor comprises a stream processor.

17. The computing device according to claim 16, wherein the stream processor comprises a field programmable gate array.

18. The computing device according to claim 13, wherein the scaling factors are calculated by the central processing unit.

19. The computing device according to claim 18, further operable to send, from the central processing unit, data comprising the difference between the scaling factor for the next step and the currently-applied scaling factor from the previous step to the further processor.

20. A computing device comprising:
a central processing unit; and
a further processor, the further processor being operable to perform numerical computations comprising a plurality of stepwise iterations in a fixed point numerical format having a scaling factor that is selectively variable in order to prevent overflow and to reduce underflow, and to apply a predetermined change to the scaling factor of the data during each step of the iterative computation, the value of the applied predetermined change being the same for each step of the iterative calculation, the numerical computations being performed on a plurality of arrays of data, each array being scaled to a common scaling factor during each step of the iterative calculation; and
the central processing unit being operable to update the scaling factor for the next step based at least in part upon the resulting values of a previous step during each step of the iterative computation.

21. The computing device according to claim 20, wherein the central processing unit is further operable to select the scaling factor for a particular step in dependence upon the resulting values of a previous step of the calculation.

22. The computing device according to claim 21, wherein the central processing unit is further operable to select a scaling factor in dependence upon the maximum magnitude of the resulting values or in dependence upon the position of the most significant non-zero bit of the resulting values.

23. The computing device according to claim 20, wherein the further processor is further operable to perform the calculations by:
inputting data to a processor;
scaling the inputted data using the scaling factor; and
calculating a step of a numerical computation in a fixed point format using the scaled data; and
wherein the central processing unit is further operable to update the scaling factor based upon the resulting values of the calculation of the step, the updated scaling factor being greater than, less than or equal to the previous scaling factor;
the computing device being operable to repeat the steps of inputting, scaling, calculating and updating for the next step of the numerical computation using the updated scaling factor.

24. The computing device according to claim 20, wherein the scaling factor is selected to prevent overflow and to reduce underflow.

25. A method of performing an iterative computation on a computing device comprising a central processing unit and a further processor, the method comprising:
performing, on the further processor, numerical computations comprising a plurality of stepwise iterations in a fixed point numerical format having a scaling factor that is selectively variable in order to prevent overflow and to reduce underflow, the numerical computations being performed on a plurality of arrays of data, each array being scaled to a common scaling factor during a given each step of the iterative computation;
applying, using the further processor, a predetermined change to the scaling factor of the data during each step of the iterative computation, the value of the applied predetermined change being the same for each step of the iterative calculation; and
updating, on the central processing unit, the scaling factor for the next step based upon the resulting values of a previous step during each step of the iterative computation.

26. A non-transitory computer usable storage medium having a computer program product comprising one or more software portions for performing the steps of claim 1 stored thereon.

27. A method of processing an iterative computation on a computing device comprising at least one processor by performing, on a stream processor, an iterative calculation on data in a fixed point numerical format having a scaling factor that is selectively variable for different steps of the calculation in order to prevent overflow and to reduce underflow, the method comprising:

inputting data to the stream processor;

scaling the inputted data using a scaling factor selected to prevent overflow and to reduce underflow;

calculating, by the stream processor, a step of a numerical computation in a fixed point format using the scaled data;

applying, using the stream processor, a predetermined change to the scaling factor of the data, the value of the applied predetermined change being the same for each step of the iterative calculation;

updating, using a processor, the scaling factor for the next step based upon the resulting values of the calculation step;

repeating the steps of inputting, scaling, calculating, applying, and updating for the next step of the numerical computation using the updated scaling factor.

28. A computing device comprising a stream processor operable to process an iterative computation on a computing device, the stream processor being operable to perform calculations in a fixed point numerical format having a scaling factor that is selectively variable for different steps of the calculation in order to prevent overflow and to reduce underflow, the computing device being operable to carry out the steps of:

inputting data to the stream processor;

scaling the inputted data using a scaling factor selected to prevent overflow and to reduce underflow;

calculating, on the stream processor, a step of a numerical computation in a fixed point format using the scaled data;

applying, using the stream processor, a predetermined change to the scaling factor, the value of the applied predetermined change being the same for each step of the iterative calculation;

updating, using a processor, the scaling factor for the next step based upon the resulting values of the calculation step;

repeating the steps of inputting, scaling, calculating, applying, and updating for the next step of the numerical computation using the updated scaling factor.

\* \* \* \* \*